United States Patent
Komori et al.

(10) Patent No.: US 11,709,788 B2
(45) Date of Patent: Jul. 25, 2023

(54) ADAPTER DEVICE AND COMMUNICATION METHOD

(71) Applicant: KABUSHIKI KAISHA TOSHIBA, Tokyo (JP)

(72) Inventors: Kenji Komori, Yokosuka (JP); Takashi Doi, Fuchu (JP); Hideki Miyazato, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 99 days.

(21) Appl. No.: 17/186,530

(22) Filed: Feb. 26, 2021

(65) Prior Publication Data

US 2021/0311892 A1    Oct. 7, 2021

(30) Foreign Application Priority Data

Apr. 1, 2020 (JP) .................. 2020-066264

(51) Int. Cl.
    *G06F 13/38* (2006.01)
    *G06F 13/20* (2006.01)
    (Continued)

(52) U.S. Cl.
    CPC ............ *G06F 13/387* (2013.01); *G06F 13/20* (2013.01); *G06F 13/4027* (2013.01);
    (Continued)

(58) Field of Classification Search
    CPC . G06F 1/08; G06F 13/20; G06F 13/38; G06F 13/382; G06F 13/385;
    (Continued)

(56) References Cited

U.S. PATENT DOCUMENTS 10,038,871 B2   7/2018   Park
10,327,049 B2   6/2019   Suzuki et al.
(Continued)

FOREIGN PATENT DOCUMENTS

JP   2018-515047 A   6/2018
JP   2018-191245 A   11/2018

OTHER PUBLICATIONS

"High Definition Multimedia Interface Specification". Version 2.0a. Mar. 19, 2015. HDMI Forum, Inc. (Year: 2015).*

*Primary Examiner* — Thomas J. Cleary

(74) *Attorney, Agent, or Firm* — Oblon, McClelland, Maier & Neustadt, L.L.P.

(57) ABSTRACT

An adapter device communicates with a sink device and a source device using first and second communication schemes, respectively. The adapter device includes: a transceiver receiving a state read request by detecting that a serial data line connected between the adapter device and the sink device is driven to a low level when a serial clock line connected therebetween is at a high level, and drive the serial data line to the low level and drive the serial clock line to a low level; a transmitter transmitting the state read request to the source device after the serial clock line is driven to the low level; and a receiver receiving a state read signal to read data of a state register in the sink device from the source device, wherein the transceiver transmits the state read signal to the sink device via the serial data line.

10 Claims, 8 Drawing Sheets

(51) Int. Cl.
*G06F 13/42* (2006.01)
*G06F 1/08* (2006.01)
*G06F 13/40* (2006.01)

(52) U.S. Cl.
CPC ............ *G06F 13/4291* (2013.01); *G06F 1/08* (2013.01); *G06F 2213/0042* (2013.01); *G06F 2213/3852* (2013.01)

(58) Field of Classification Search
CPC ............... G06F 13/387; G06F 13/4004; G06F 13/4009; G06F 13/4027; G06F 13/4063; G06F 13/4291; G06F 2213/3852; G06F 2213/0042
See application file for complete search history.

(56) References Cited

U.S. PATENT DOCUMENTS

| | | | |
|---|---|---|---|
| 2006/0209892 A1* | 9/2006 | MacMullan | H04W 12/08 386/E5.07 |
| 2011/0243035 A1* | 10/2011 | Hall | H04L 5/1415 370/276 |
| 2017/0373882 A1* | 12/2017 | Doi | H04L 12/40169 |
| 2020/0244923 A1* | 7/2020 | Kabuto | G06F 13/4072 |
| 2021/0219016 A1* | 7/2021 | Zanetti | G02B 6/4284 |
| 2022/0327087 A1* | 10/2022 | Chen | G06F 13/4282 |

* cited by examiner

ADAPTER DEVICE AND COMMUNICATION METHOD

CROSS REFERENCE TO RELATED APPLICATIONS

This application is based upon and claims the benefit of priority from the prior Japanese Patent Application No. 2020-066264, filed on Apr. 1, 2020, the entire contents of which are incorporated herein by reference.

FIELD

Embodiments described herein relates to an adapter device and a communication method.

BACKGROUND

SCDC (status and control data channel) of HDMI (high definition media interface) is a protocol with an extended I2C (inter-integrated circuit). The SCDC has an SCDC read request function whereby an HDMI sink device (I2C slave) requests an HDMI source device (I2C master) to make a status check of the HDMI sink device (e.g., to check whether or not an update flag at an SCDC register of the HDMI sink device has been updated). Examples of the status check include check as to whether a video signal or audio signal can be received, whether a buffer is overflowing or underflowing or whether compressed data can be decompressed.

On the other hand, an HDMI alt-mode is provided as a standard that allows an HDMI signal to be transmitted via a USB (universal serial bus)-Type-C connector. However, the HDMI alt-mode has a problem that a timeout may be generated when no response can be received within a predetermined period of time after an SCDC read request is outputted. For this reason, the standard prohibits use of the SCDC read request function in the HDMI alt-mode. For this reason, in HDMI source devices, polling is performed at regular intervals to conduct a status check on the HDMI sink devices. However, conducting polling at regular intervals imposes a load on the HDMI source devices and increases power consumption. Moreover, this also consumes a bus band.

DETAILED DESCRIPTION

There is provided an adapter device that communicates with a sink device using a first communication scheme and communicates with a source device using a second communication scheme different from the first communication scheme, the signal relating to the first communication scheme being communicated between the adapter device and the source device The adapter device includes: a transceiver configured to receive a state read request by detecting, that a serial data line connected between the adapter device and the sink device is driven to a low level when a serial clock line connected between the adapter device and the sink device is at a high level, and, in response to the reception of the state read request, drive the serial data line to the low level and drive the serial clock line to a low level;

The adapter device includes a transmitter configured to transmit the state read request to the source device after the serial clock line is driven to the low level.

The adapter device includes a receiver configured to receive a state read signal to read data of a state register in the sink device from the source device that receives the state read request.

The adapter device includes the transceiver transmits the state read signal to the sink device via the serial data line.

Hereinafter, embodiments of the present invention will be described with reference to the accompanying drawings.

First Embodiment

Figure 1:
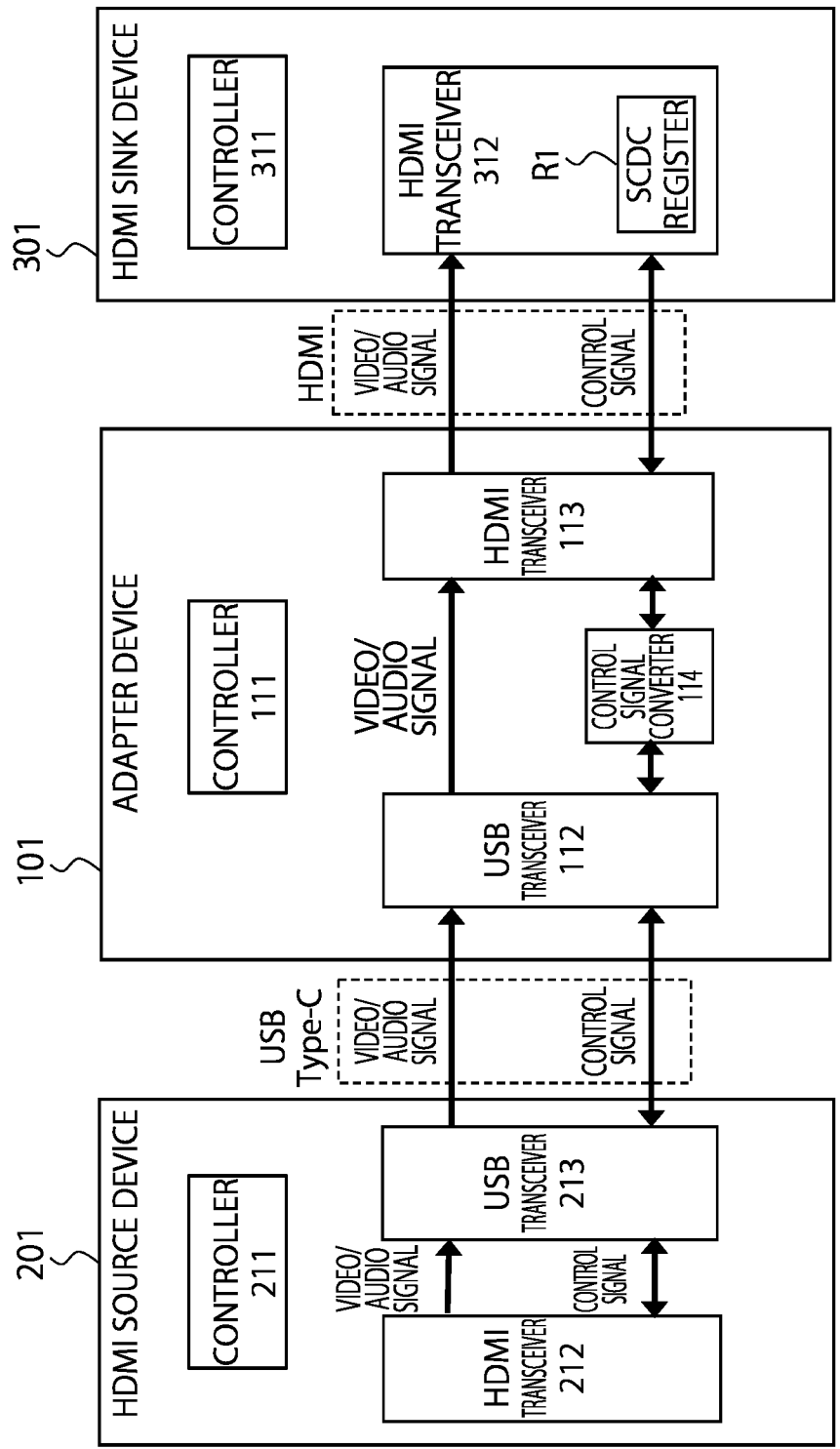
FIG. 1 is a block diagram of a communication system according to a first embodiment.

FIG. 1 is a block diagram of a communication system according to a first embodiment. The communication system in FIG. 1 is provided with an adapter device 101, an HDMI source device 201 and an HDMI sink device 301. An SCDC of the HDMI is a protocol with an extended I2C, and the SCDC is used between the adapter device 101 and the HDMI sink device 301. The adapter device 101 corresponds to a master of the I2C and the HDMI sink device 301 corresponds to a slave of the I2C. Hereinafter, the HDMI source device 201 will be described as a source device 201 and the HDMI sink device 301 will be described as a sink device 301.

The adapter device 101 and the sink device 301 communicate using the HDMI. On the other hand, the adapter device 101 and the source device 201 communicate HDMI-related signals using a communication scheme different from the HDMI. The adapter device 101 is configured as a cable adapter that connects the sink device 301 and the source device 201. The HDMI corresponds to the first communication scheme used between the adapter device 101 and the sink device 301.

In the present embodiment, USB Type-C is used as the communication scheme different from the HDMI. HDMI alt-mode is provided as a standard that allows transmission of HDMI-related signals via a USB-Type-C connector. The HDMI alt-mode is executable between the adapter device 101 and the source device 201. USB Type-C corresponds to a second communication scheme used between the adapter device 101 and the source device 201.

An overview of the present embodiment will be described. The adapter device 101 receives an SCDC read request (state read request) from the sink device 301 by detecting that a serial data line (SDA line) is driven to a low level (L level) when a serial clock line (SCL line) is at a high level (H level). Upon receiving the SCDC read request, the adapter device 101 drives the serial data line (SDA line) to an L level and further drives the serial clock line (SCL line) to the L level (generates I2C start condition). This causes the I2C bus (that is, the SDA line and the SCL line) to be set in an I2C start condition state and causes the sink device 301 to be set in a state waiting for communication from the adapter device 101. This prevents a timeout of the SCDC read request from being generated in the sink device 301. While the SCL line and the SDA line are being driven to L level, the adapter device 101 transmits the SCDC read request to the source device 201 side using USB Type-C. Upon receiving the SCDC read request, the source device 201 transmits the SCDC read signal for reading the SCDC register (state register) of the sink device 301 to the adapter device 101. The adapter device 101 transmits the SCDC read signal to the sink device 301 via the SDA line. The SCDC register is read in this way. The adapter device 101 transmits the read data of the SCDC register to the source device 201. This allows the sink device 301 to request SCDC read to the source device connected to the adapter device 101 in the HDMI alt-mode and receive an SCDC read signal. That is, the SCDC read request function can be executed between the source device 201 and the sink device 301. Hereinafter, the present embodiment will be described in further detail.

(Adapter Device 101)

As shown in FIG. 1, the adapter device 101 is provided with a controller 111, a USB transceiver 112, an HDMI transceiver 113 (transceiver, second transceiver) and a control signal converter 114.

The adapter device 101 and the sink device 301 are connected via a plurality of signal lines including a video/audio signal line communicating an HDMI video/audio signal and a control line communicating a control signal. The HDMI transceiver 113 transmits/receives an HDMI control signal to/from the HDMI transceiver 312 of the sink device 301 via a control line. The HDMI transceiver 113 transmits the HDMI video/audio signal to the HDMI transceiver 312 via the video/audio signal line.

Figure 2:
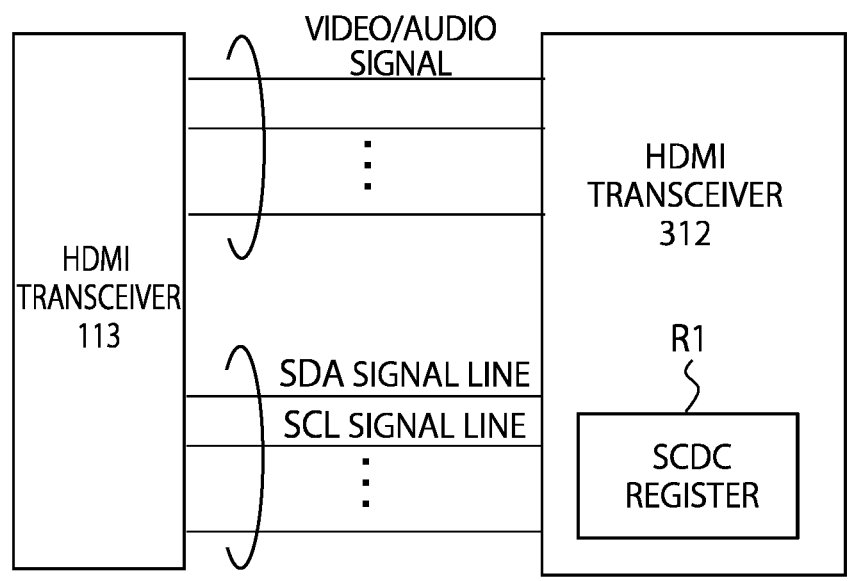
FIG. 2 is a diagram illustrating a configuration example of a video/audio signal line and a control line between an adapter device and an HDMI sink device.

FIG. 2 illustrates a configuration example of the video/audio signal line and the control line connecting the adapter device 101 and the sink device 301. The control line includes a plurality of signal lines (e.g., 7 lines) including a serial data line (SDA line) and a serial clock signal line (SCL line). The video/audio signal line includes a plurality of signal lines (e.g., 8 lines). The SDA line is pulled up to a supply voltage and the SDA line is at H level unless at least one of the devices (adapter device or sink device) connected to the SDA line is driven to L level. That is, the SDA line is at L level if even one device is driven to L level among the devices connected to the SDA line. Although only one sink device 301 is shown in FIG. 1, a plurality of sink devices 301 may be connected. In this case, the plurality of sink devices 301 are connected to the adapter device 101 by sharing the same control line (e.g., SDA line, SCL line).

The USB transceiver 112 of the adapter device 101 receives an HDMI video/audio signal from a USB transceiver 213 of the source device 201 via a USB Type-C video/audio signal line. The USB transceiver 112 transmits/receives an HDMI control signal in USB Type-C format to/from the USB transceiver 213 of the source device 201 via a USB Type-C control line. The USB transceiver 112 is provided with a transmitter configured to transmit a signal to the source device 201 and a receiver configured to receive a signal from the source device 201.

The control signal converter 114 is configured to perform signal format conversion (protocol conversion) between the HDMI control signal and the USB Type-C control signal. In the following description, if there is such description that the adapter device 101 transmits the SCDC read request received from the sink device 301 to the source device 201, suppose that protocol conversion is performed even when it is not clearly stated that protocol conversion of the SCDC read request is performed. In the case where the adapter device 101 transmits the SCDC read signal received from the source device 201 to the sink device 301, also suppose that protocol conversion is performed even when it is not clearly stated that protocol conversion of the SCDC read signal is performed.

The controller 111 of the adapter device 101 is connected to the USB transceiver 112, the HDMI transceiver 113 and the control signal converter 114. The controller 111 controls the USB transceiver 112, the HDMI transceiver 113 and the control signal converter 114.

The adapter device 101 includes a USB Type-C terminal for connection to the source device 201 and an HDMI terminal for connection to the sink device 301.

(Sink Device 301)

The sink device 301 is provided with a controller 311 and an HDMI transceiver 312. The sink device 301 includes an HDMI terminal for connection to the adapter device 101.

The HDMI transceiver 312 transmits/receives an HDMI control signal to/from the HDMI transceiver 113 of the adapter device 101 via a control line. The HDMI transceiver 312 receives an HDMI video/audio signal from the HDMI transceiver 113 of the adapter device 101 via a video/audio signal line. The HDMI transceiver 312 includes a plurality of registers such as an SCDC register R1 (state register).

The controller 311 is connected to the HDMI transceiver 312. The controller 311 controls the HDMI transceiver 312.

(Source Device 201)

The source device 201 is provided with a controller 211, an HDMI transceiver 212 (second transceiver) and a USB transceiver 213. The source device 201 includes a USB Type-C terminal for connection to the adapter device 101. The adapter device 101 and the source device 201 are connected via a USB Type-C video/audio signal line and a control line. The video/audio signal line and the control line include a plurality of signal lines respectively.

The USB transceiver 213 receives a video signal from the HDMI transceiver 212. The USB transceiver 213 transmits the received video signal to the USB transceiver 112 of the adapter device 101 via the USB Type-C video/audio signal line. The USB transceiver 213 provides the control signal received from the USB transceiver 112 of the adapter device 101 via the USB Type-C control line to the HDMI transceiver 212 in an HDMI format. The USB transceiver 213 transmits the control signal provided from the HDMI transceiver 212 to the USB transceiver 112 of the adapter device 101 in the USB Type-C format via the USB Type-C control line.

The controller 211 is connected to the HDMI transceiver 212 and the USB transceiver 213. The controller 211 controls the HDMI transceiver 212 and the USB transceiver 213.

The sink device 301 is provided with an SCDC read request function. When the sink device 301 transmits an SCDC request to the source device 201 according to an instruction of the controller 311, the sink device 301 drives the SDA line to L level. More specifically, the sink device 301 drives the SDA line to L level while both the SCL line and the SDA line are at H level for a certain period of time. The SCDC read request is transmitted through this operation. "Driving a signal line to L level" means driving a signal line from H level to L level and maintaining the L level, or maintaining a signal line originally at L level at the L level. Here, the SCDC read request function will be described.

The SCDC read request function is a function whereby the sink device 301 requests the source device 201 to read data (update flag) in the SCDC register R1 of the sink device

301, that is, a state of the sink device 301, and the source device 201 receives the read request signal of the SCDC register R1 from the sink device 301. When the sink device 301 supports the SCDC read request function, a capability bit (RR_Capable) of an E-EDID register (not shown) in the HDMI transceiver 312 of the sink device 301 is set to "1." The capability bit is set to "1" at arbitrary timing, for example, when the sink device 301 is started.

When the sink device 301 supports the SCDC read request function, an enabling bit (RR_Enable) included in the SCDC register R1 needs to be set to "1" to enable the SCDC read request function. Via the adapter device 101, the source device 201 first confirms whether or not the capability bit (RR_Capable) of the E-EDID register is set to "1." If the capability bit (RR_Capable) is set to "1," the source device 201 sets the enabling bit (RR_Enable) included in the SCDC register R1 to "1" next. "1" of the enabling bit means "enabled" and "0" means "disabled."

The sink device 301 detects the presence or absence of cable connection to the adapter device 101 (hot plug detection), and when there is no connection, the sink device 301 resets the enabling bit (RR_Enable) to "0." When there is connection, the source device 201 needs to confirm whether or not the enabling bit (RR_Enable) is set to "1" ("enabled"). When the source device 201 confirms that the enabling bit is set to "1," the source device 201 starts receiving the SCDC read request function from the sink device 301. This operation is an operation defined in the SCDC standard of the HDMI.

Specific examples will be described hereinafter. Suppose a situation in which a video/audio signal is being transmitted from the source device 201 to the sink device 301 via the adapter device 101 (e.g., transmitted uncompressed). In this case, suppose that any one update flag of among the plurality of update flags included in the SCDC register R1 in the sink device 301 is updated from "0" to "1." That is, suppose that at the sink device 301 a need occurs to notify an update state (e.g., that the sink device 301 has become ready to receive compressed data) corresponding to the update flag. In this case, the sink device 301 generates an SCDC read request to the source device 201.

The SCDC read request is generated by the sink device 301 driving the SDA line to L level while both the SCL line and the SDA line are at H level for a certain period of time as described above. The state in which both the SCL line and the SDA line are at H level for a certain period of time is also referred to as a state in which the I2C bus is free. When at least one of the SCL line and the SDA line is at L level (when the I2C bus is busy), for example, when the SDA line is at H level, the sink device 301 postpones the generation of the SCDC read request until the I2C bus becomes free.

After the SCDC read request is generated by the sink device 301 driving the SDA line to L level, if the SCL line is not driven to L level before a certain period of time elapses, this is judged as a timeout. In this case, the SDA line is restored to H level by stopping the operation of driving the SDA line to L level. Restoring the SDA line to H level is also called "releasing." That is, "releasing" means stopping driving the SDA line to L level. When it is detected before a certain period of time elapses that the SCL line has been driven to L level, the operation of driving the SDA line to L level is stopped (the SDA line is driven to L level by the adapter device 101 as will be described below).

Upon receiving the SCDC read request from the sink device 301, the HDMI transceiver 113 of the adapter device 101 drives the SDA line to L level, and furthermore drives the SCL line to L level. Note that driving the SCL line to L level while the SDA line is kept at H level is prohibited by the standard. Both the adapter device 101 (I2C master) and the sink device 301 (I2C slave) can drive the SDA line, whereas only the master can drive the SCL line.

Upon detecting that the SCL line has been driven to L level, the sink device 301 stops the operation of driving the SDA line to L level as described above. This causes the I2C bus to be placed in a start condition state and the sink device 301 is placed in a state waiting for communication from the adapter device 101. That is, no timeout is generated. The sink device 301 waits for an SCDC read signal to be received.

The adapter device 101 transmits the SCDC read request to the source device 201 using USB Type-C while driving the SDA line to L level. That is, the SCDC read request received by the HDMI transceiver 113 is protocol-converted by the control signal converter 114, and the SCDC read request is transmitted from the USB transceiver 112 to the source device 201. Note that the sink device 301 (I2C slave) is subject to the above-described timeout constraint on a time length during which the SCL line is driven to L level, whereas the adapter device 101 (I2C master) is not subject to any constraint on a length of time during which the SDA line and the SCL line are driven to L level.

The source device 201 receives the SCDC read request at the USB transceiver 213 and provides the received SCDC read request to the HDMI transceiver 212. In response to the SCDC read request, the HDMI transceiver 212 generates an SCDC read signal and provides the SCDC read signal to the USB transceiver 213. The USB transceiver 213 transmits the SCDC read signal to the adapter device 101 via the USB Type-C control line. The SCDC read signal may include an address of the SCDC register.

The USB transceiver 112 of the adapter device 101 receives the SCDC read signal and the control signal converter 114 converts the received SCDC read signal to an HDMI format. The HDMI transceiver 113 transmits the converted SCDC read signal to the sink device 301 on standby via the HDMI control line.

Upon receiving the SCDC read signal, the HDMI transceiver 312 of the sink device 301 reads data of the SCDC register R1 (SCDC data or state data) and transmits the SCDC data to the adapter device 101 via the SDA line. The SCDC data includes, for example, an updated value of the update flag.

When the HDMI transceiver 113 of the adapter device 101 receives the SCDC data from the sink device 301 via the SDA line (when reading of the SCDC data is completed), the control signal converter 114 converts the SCDC data. The USB transceiver 112 transmits the converted SCDC data to the source device 201 via the USB Type-C control line. That is, an SCDC read response indicating that the reading of the SCDC data (execution of the SCDC read request) has been completed is transmitted to the source device 201. The HDMI transceiver 212 of the source device 201 grasps an update state of the sink device 301 (e.g., ready to receive compressed data) based on the update flag included in the SCDC data and transmits, for example, a compressed video/audio signal thereafter.

Figure 3A:
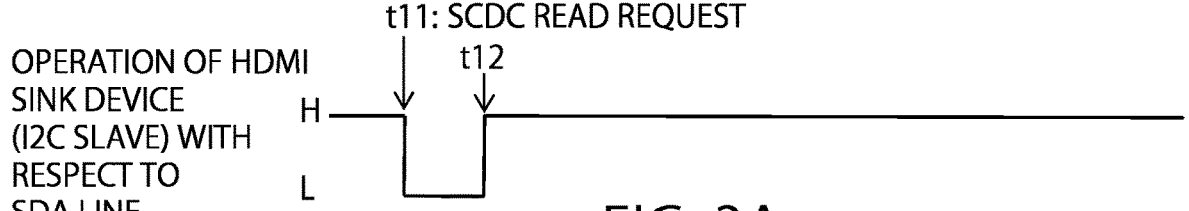
FIGS. 3A to 3C each is a diagram illustrating timing charts of operations of the adapter device and the HDMI sink device.
Figure 3B:
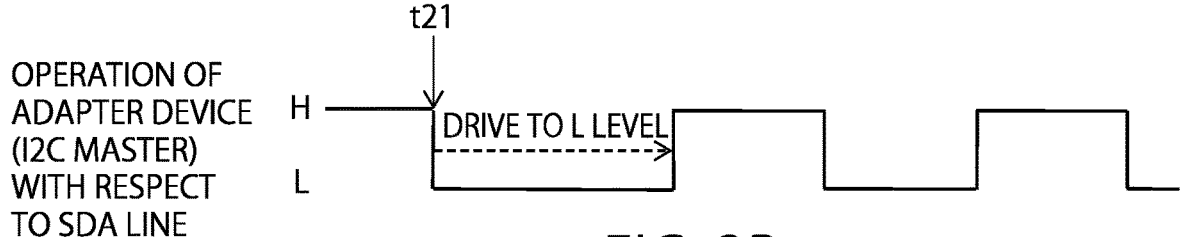
Figure 3C:
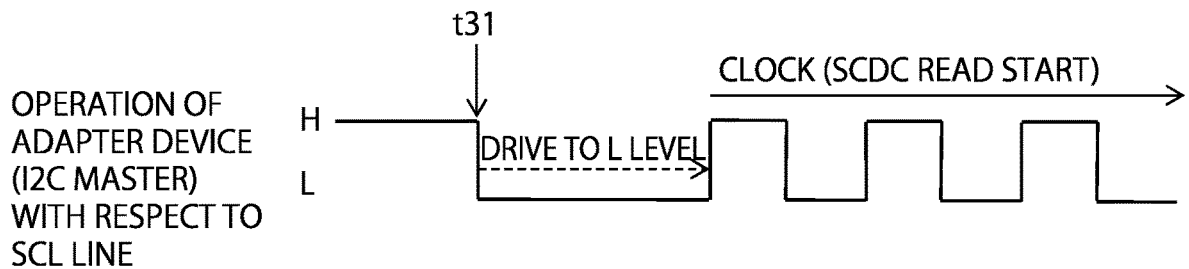

FIG. 3 illustrates timing charts of operations of the adapter device 101 (I2C master) and the sink device 301 (I2C slave). FIG. 3A illustrates an example of operation timing of the sink device 301 with respect to the SDA line, FIG. 3B illustrates an example of operation timing of the adapter device 101 with respect to the SDA line and FIG. 3C illustrates an example of operation timing of the adapter device 101 with respect to the SCL line.

As shown in FIG. 3A, in order to transmit the SCDC read request at time t11, the sink device 301 drives the serial data line (SDA line) to L level as the I2C slave. Note that the SCL line at this time is at H level.

Upon detecting the SCDC read request from the sink device 301, the adapter device 101 drives the SDA line to L level at time t21 after time t11 as shown in FIG. 3B (note that the SDA line has already been set at L level by the sink device 301). When driving of the SDA line to L level is started, the serial clock line (SCL line) is then driven to L level at time t31 after time t21 as shown in FIG. 3C and the SCL line is driven to L level.

Upon detecting that the SCL line has been driven to L level, the sink device 301 stops the operation of driving the SDA line to L level at time t12 as shown in FIG. 3A. Since the SDA line has been driven to L level by the adapter device 101, no timeout of the SCDC read request is generated even when the operation of driving the SDA line to L level is stopped.

While driving the SDA line and the SCL line to L level, the adapter device 101 transmits the SCDC read request to the source device 201 using USB Type-C. The source device 201 that has received the SCDC read request transmits the SCDC read signal to the adapter device 101 using USB Type-C. Upon receiving the SCDC read signal from the source device 201, the adapter device 101 starts reading SCDC from the sink device 301 as shown in FIG. 3B and FIG. 3C. As an example, the adapter device 101 first transmits data of a register address to the sink device 301 via the SDA line and reads the data in the register at the register address from the sink device 301 via the SDA line.

As a more specific method of data transmission/reception, the adapter device 101 controls data transmission from the adapter device 101 to the sink device 301 according to a clock transmitted via the SCL line. Similarly, the adapter device 101 controls data transmission from the sink device 301 to the adapter device 101 (that is, data read from the sink device 301) according to the clock. As an example, by controlling the signal level of the SDA line at the rising or the falling of the clock, bit data of "1" or "0" is transmitted from one to the other of the adapter device 101 and the sink device 301. For example, when the signal level of the SDA signal is H level on the falling of the clock, data of "1" is transmitted, whereas when the signal level is L level, data of "0" is transmitted.

Figure 4:
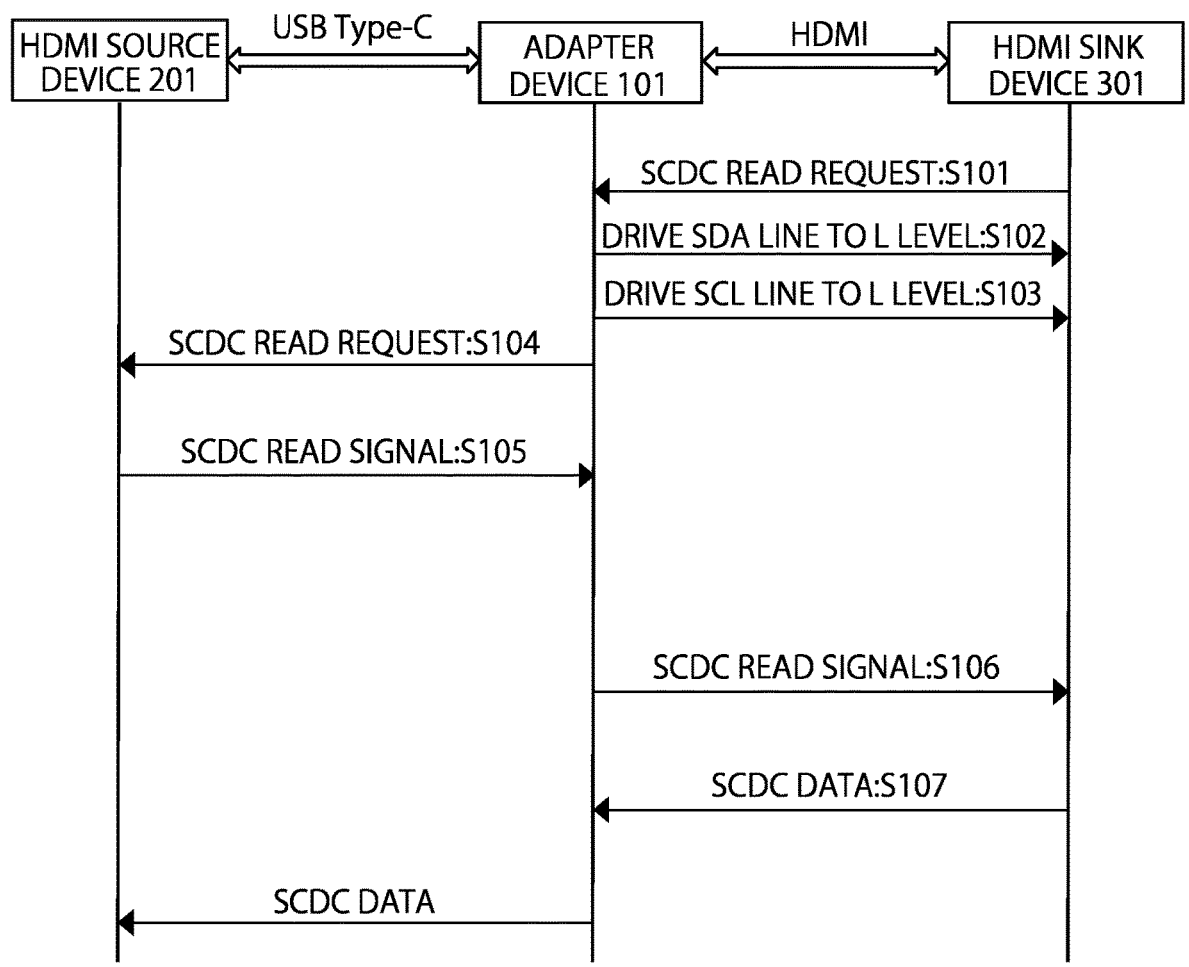
FIG. 4 is a sequence diagram of the communication system in FIG. 1.

FIG. 4 is a sequence diagram of the communication system in FIG. 1. First, the HDMI transceiver 312 of the sink device 301 (I2C slave) drives the SDA line to L level and thereby transmits an SCDC read request to the adapter device 101 (S101).

When the HDMI transceiver 113 of the adapter device 101 (I2C master) receives the SCDC read request, the HDMI transceiver 113 drives the SDA line to L level (S102) and at the same time drives the SCL line to L level (S103). That is, both the SDA line and the SCL line are driven to L level. This causes the I2C bus to be set in a start condition state and causes the sink device 301 to be in a state of waiting for communication from the adapter device 101. By detecting L level of the SCL line, the sink device 301 stops the operation of driving the SDA line to L level. Since the adapter device 101 has driven the SDA line to L level, even when the sink device 301 stops the operation of driving the SDA line to L level, no timeout of the sink device 301 is generated. Note that the I2C slave can drive the SDA line to L level only for a certain period of time (e.g., 1 ms), and a timeout is generated after a lapse of the certain period of time, but the I2C master is allowed to drive the SDA line to L level for an arbitrary period of time.

The control signal converter 114 of the adapter device 101 converts the SCDC read request to a USB Type-C format. The USB transceiver 112 transmits the converted SCDC read request to the source device 201 via the USB Type-C control line (S104).

Upon receiving the SCDC read request from the adapter device 101, the USB transceiver 213 of the source device 201 provides the SCDC read request to the HDMI transceiver 212 (S105). The HDMI transceiver 212 provides the SCDC read signal corresponding to the SCDC read request to the USB transceiver 213. The USB transceiver 213 transmits the SCDC read signal to the adapter device 101 via the USB Type-C control line.

The USB transceiver 112 of the adapter device 101 receives the SCDC read signal from the source device 201 via the control line. The control signal converter 114 converts the SCDC read signal to an HDMI format. The HDMI transceiver 113 transmits the SCDC read signal to the sink device 301 via the SCL line (S106). The SCDC read signal includes an address of the SCDC register R1 as an example.

Upon receiving the SCDC read signal, the HDMI transceiver 312 of the sink device 301 reads the data of the SCDC register R1 (SCDC data) and transmits the SCDC data to the adapter device 101 via the SDA line (S107).

When the HDMI transceiver 113 of the adapter device 101 receives the SCDC data from the sink device 301 (when reading of the SCDC data is completed), the control signal converter 114 converts the SCDC data to a USB Type-C format. The USB transceiver 112 transmits the SCDC data to the source device 201 via the USB Type-C control line (S108). That is, the USB transceiver 112 transmits an SCDC read response indicating that reading of the SCDC data (execution of the SCDC read request) has been completed to the source device 201.

As described so far, according to the present embodiment, it is possible to transmit an SCDC read request from the sink device 301 to the source device 201 even in an HDMI alt-mode and transmit an SCDC read signal from the source device 201 to the sink device 30. Since the adapter device 101 drives the SCL line to L level, even when the sink device 301 has not received the SCDC read signal within a certain period of time after the occurrence of the SCDC read request, no timeout is generated. The source device need not perform polling periodically to read the SCDC register R1, and can read the data of the SCDC register R1 with low load and low power consumption. Usage of a bus band can also be reduced. Effects such as faster switching of video output from source device 201 (e.g., switching from no compression to compression) can be expected, too.

Second Embodiment

In a second embodiment, the adapter device 101 receives an SCDC read request from the sink device 301, drives the SDA line and the SCL line to L level, then drives the SDA line to H level, and then drives the SCL line to H level. Note that in the present embodiment, the SDA line is pulled up to a supply voltage, and the SDA line is at H level in a state in which the SDA line is not driven to L level. Such a case is also expressed as a case where the signal line is driven to H level. Thus, driving the SDA line to H level and driving the SCL line to H level correspond to the I2C stop condition. This operation means that the adapter device 101 notifies to the sink device 301 that the adapter device 101 has received the SCDC read request. A busy state of the I2C bus (SDA line and SCL line) is canceled by driving both the SDA line and the SCL line to H level. That is, the I2C bus is released. In this way, the adapter device 101 can communicate with other sink devices for a period of time until the adapter device 101 transmits an SCDC read signal to the sink device 301.

Figure 5A:
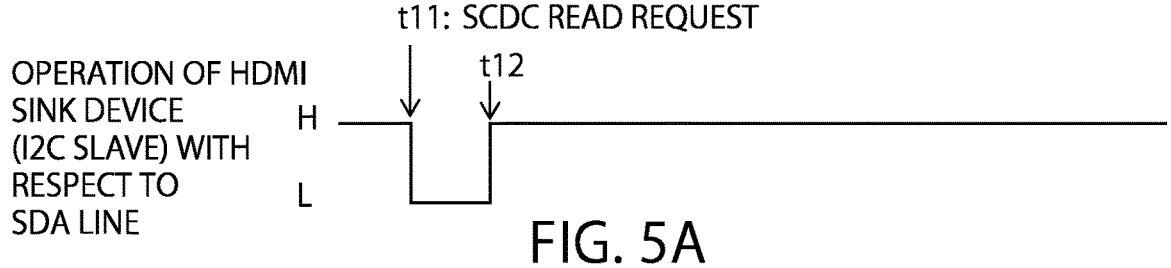
FIGS. 5A to 5C each is a diagram illustrating timing charts of operations of the adapter device and the HDMI sink device.
Figure 5B:
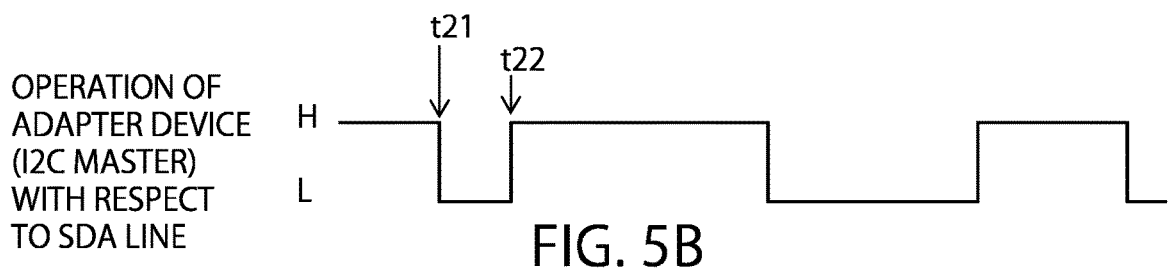
Figure 5C:
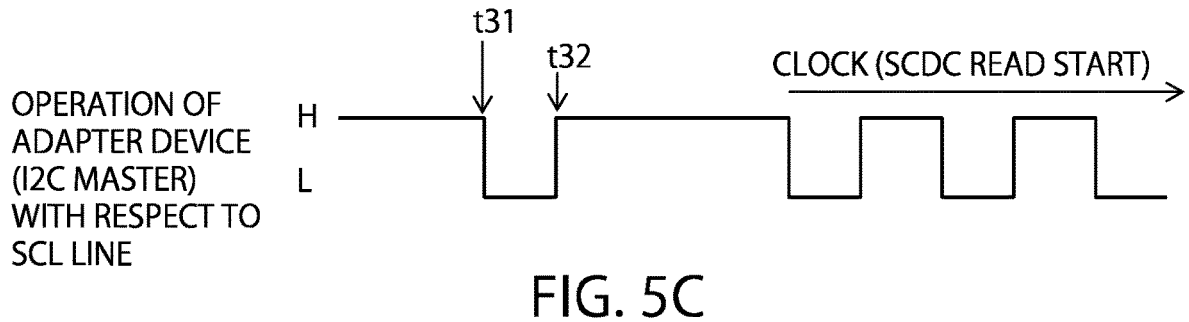

FIG. 5 illustrates timing charts of operations of the adapter device 101 (I2C master) and the sink device 301 (I2C slave). FIG. 5A illustrates an example of operation timing of the sink device with respect to the SDA line, FIG. 5B illustrates an example of operation timing of the adapter device 101 with respect to the SDA line and FIG. 5C illustrates an example of operation timing of the adapter device 101 with respect to the SCL line. FIG. 5A is the same as FIG. 3A. Upon receiving an SCDC read request from the sink device 301, the adapter device 101 drives the SDA line to H level at time t22 as shown in FIG. 5B and then drives the SCL line to H level at time t32 as shown in FIG. 5C.

Figure 6:
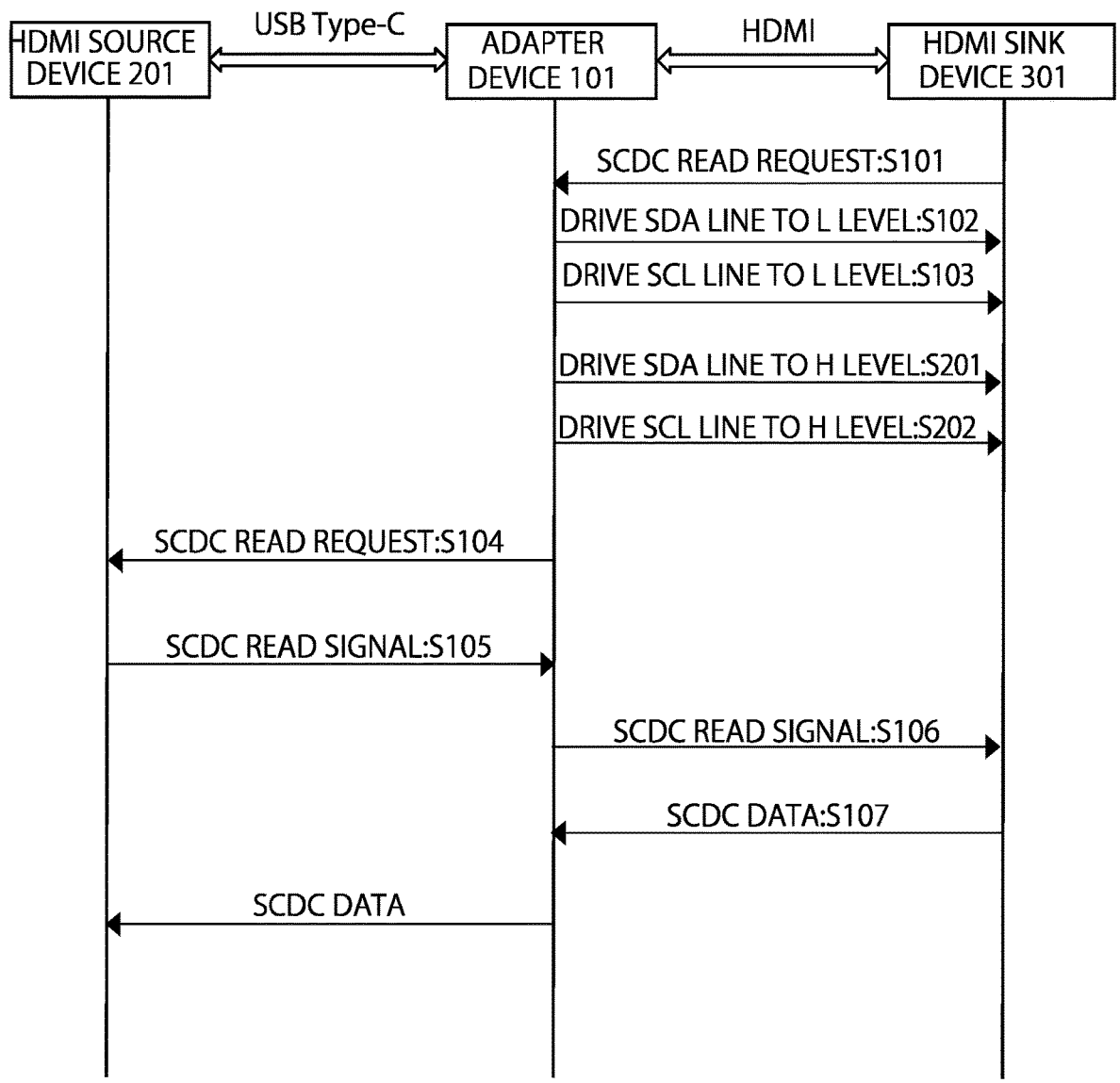
FIG. 6 is an operation sequence diagram of a communication system according to a second embodiment.

FIG. 6 is an operation sequence diagram of a communication system according to the second embodiment. Steps S101 to S103 are similar to the steps in the first embodiment. After step S103, the SDA line is driven to H level (S201), and then the SCL line is driven to H level (S202). Reception of the SCDC read request is notified to the sink device 301 and no timeout is generated. Operations hereinafter (S104 to S108) are similar to the operations in the first embodiment.

As described above, according to the present embodiment, the adapter device 101 can communicate with other sink devices for a period of time after receiving the SCDC read request from the sink device 301 and before transmitting an SCDC read signal to the sink device 301.

Third Embodiment

Figure 7:
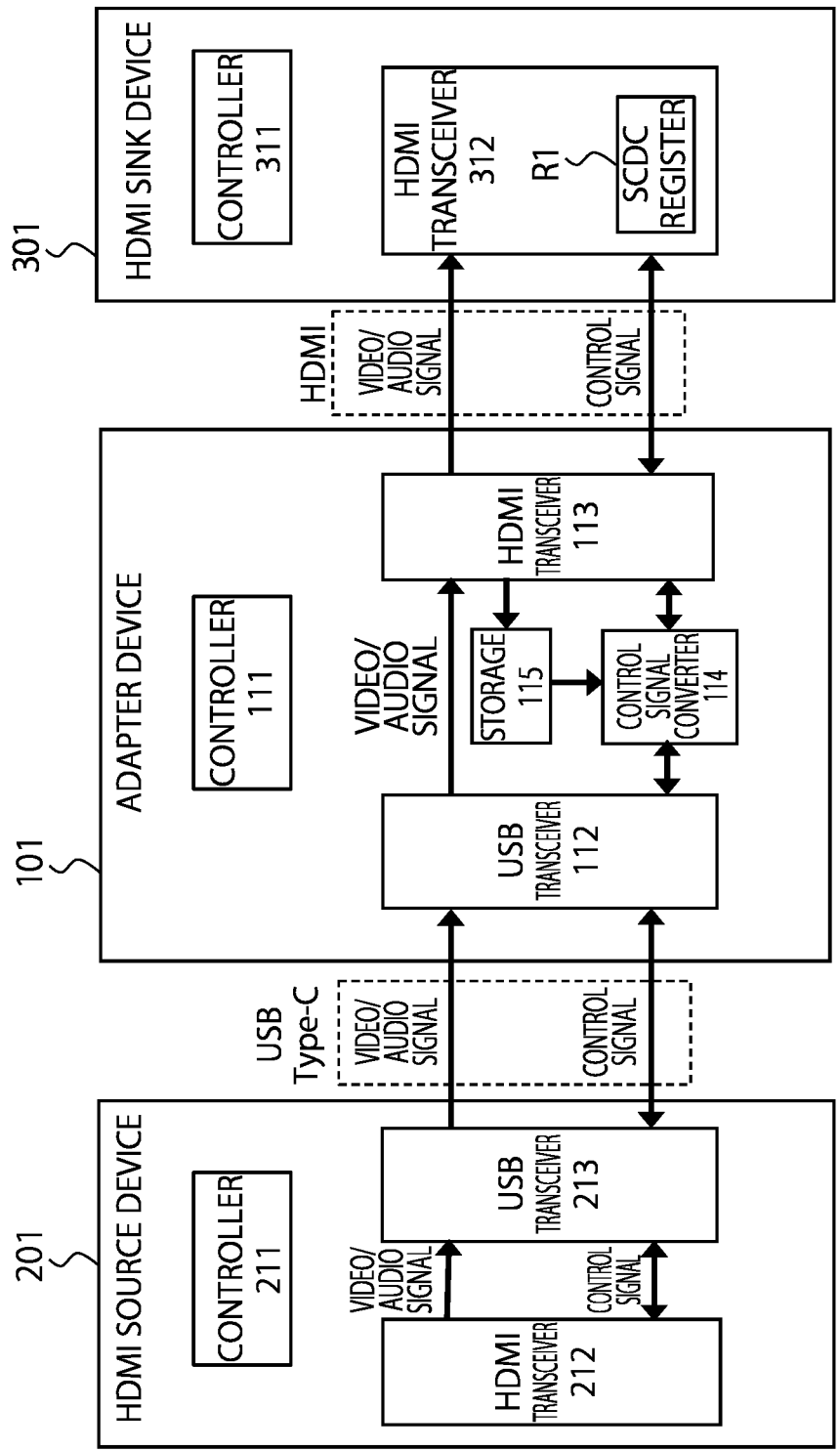
FIG. 7 is a block diagram of a communication system according to a third embodiment.

FIG. 7 is a block diagram of a communication system according to a third embodiment. A storage 115 is added to the adapter device 101. The storage 115 is a storage configured to temporarily store data or signals. The storage 115 is configured of a memory or register or the like.

In the third embodiment, when the adapter device 101 receives an SCDC read request from the sink device 301, the adapter device 101 stores the SCDC read request in the storage 115 without transmitting the SCDC read request to the source device 201. The adapter device 101 transmits an SCDC read signal to the sink device 301 (instead of the source device 201), reads the data of the SCDC register R1 from the sink device 301 and stores the read data of the SCDC register R1 in the storage 115. After that, the adapter device 101 protocol-converts the SCDC read request stored in the storage 115 through the control signal converter 114 and transmits the SCDC read request to the source device 201. Upon receiving the SCDC read request, the source device 201 transmits an SCDC read signal to the adapter device 101. Upon receiving the SCDC read signal, the adapter device 101 protocol-converts the data of the SCDC register R1 stored in the storage 115 through the control signal converter 114 and transmits the data to the source device 201.

Figure 8:
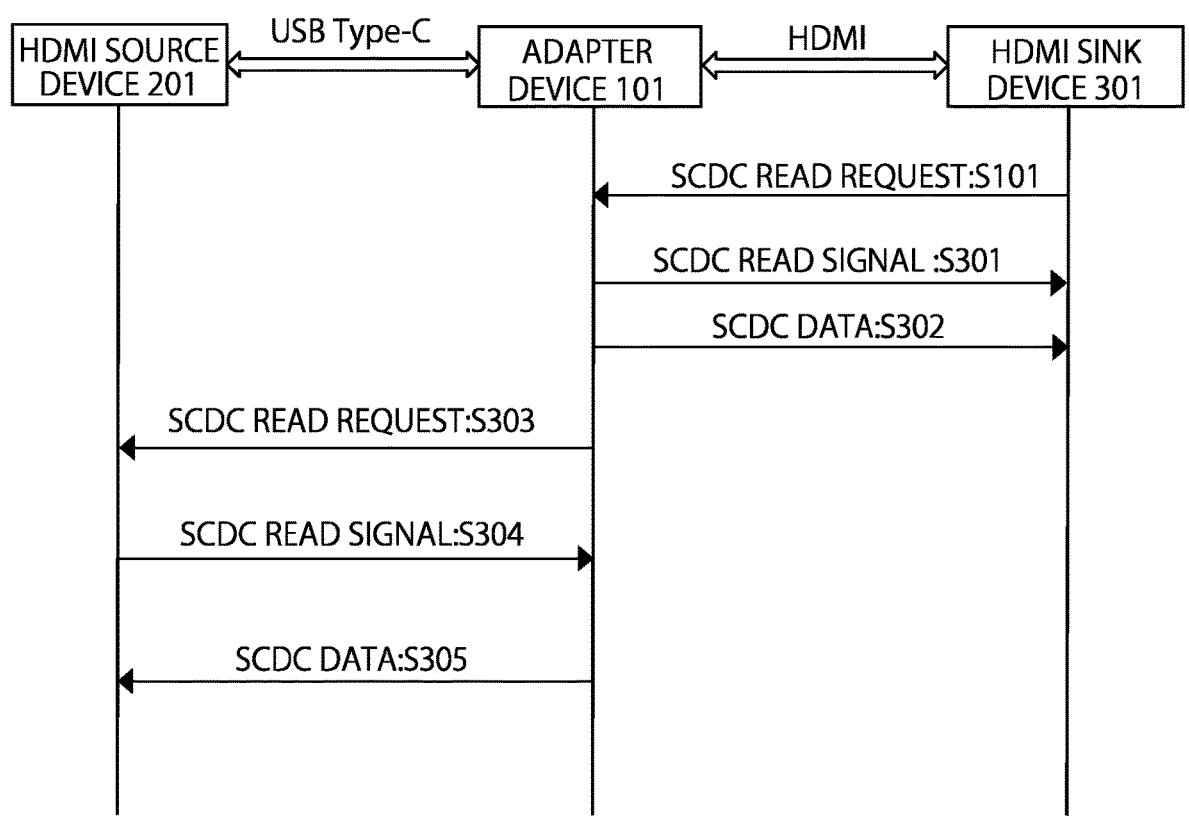
FIG. 8 is an operation sequence diagram of the communication system according to the third embodiment.

FIG. 8 is an operation sequence diagram of a communication system according to the third embodiment. The sink device 301 transmits an SCDC read request to the adapter device 101 (S101).

Upon receiving the SCDC read request, the adapter device 101 stores the SCDC read request in the storage 115. The adapter device 101 transmits an SCDC read signal (first state read signal) to the sink device 301 within a predetermined time after receiving the SCDC read request (S301). That is, the adapter device 101 transmits the SCDC read signal instead of the source device 201. The predetermined time falls within a timeout time of the SCDC read request. The adapter device 101 reads SCDC data from the sink device 301 (S302). The adapter device 101 stores the read SCDC data in the storage 115. After that, the adapter device 101 transmits the SCDC read request stored in the storage 115 to the source device 201 (S303). Steps S101, S301 and S302 correspond to execution of the SCDC read function carried out between a general source device and sink device without intervention of any adapter device.

Upon receiving the SCDC read request, the source device 201 transmits an SCDC read signal (second state read signal) to the adapter device 101 (S304).

Upon receiving the SCDC read signal, the adapter device 101 transmits the SCDC data stored in the storage 115 to the source device 201 (S305).

As described so far, according to the present embodiment, it is possible to complete communication between the adapter device 101 and the sink device 301 quickly and thereby release the I2C bus quickly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An adapter device that communicates with a sink device using a first communication scheme and communicates with a source device using a second communication scheme different from the first communication scheme, a signal relating to the first communication scheme being communicated between the adapter device and the source device, the adapter device comprising:
 a transceiver configured to receive a state read request by detecting, that a serial data line connected between the adapter device and the sink device is driven to a low level when a serial clock line connected between the adapter device and the sink device is at a high level, and, in response to reception of the state read request, drive the serial data line to the low level and drive the serial clock line to a low level;
 a transmitter configured to transmit the state read request to the source device after the serial clock line is driven to the low level; and
 a receiver configured to receive a state read signal to read data of a state register in the sink device from the source device that receives the state read request, wherein
 the transceiver transmits the state read signal to the sink device via the serial data line, and
 the transceiver is configured to keep driving the serial clock line to the low level and driving the serial data line to the low level to transmit the state read request to the source device, until receiving the state read signal from the source device.

2. The adapter device according to claim 1, wherein
after the transceiver drives the serial clock line to a low level, the transceiver drives the serial data line to a high level, and further drives the serial clock line to a high level, and
the transmitter transmits the state read request after the serial clock line is driven to a high level.

3. The adapter device according to claim 1, wherein
the transceiver receives via the serial data line the data transmitted from the sink device that receives the state read signal, and
the transmitter transmits the data to the source device.

4. The adapter device according to claim 1, wherein
the first communication scheme is HDMI (High Definition Media Interface).

5. The adapter device according to claim 4, wherein
the state read request is an SCDC (Status and Control Data Channel) read request.

6. The adapter device according to claim 1, wherein
the second communication scheme is USB (Universal Serial Bus) Type-C.

7. The adapter device according to claim 1, comprising a converter configured to convert the state read request received from the sink device to a format of the second communication scheme, wherein
the transmitter transmits the converted state read request to the source device.

8. The adapter device according to claim 7, wherein
the converter converts the state read signal received from the source device to a format of the first communication scheme and transmits the converted state read signal to the sink device.

9. A communication system comprising:
a sink device compliant with a first communication scheme; and
an adapter device configured to communicate with the sink device using the first communication scheme and communicate with a source device using a second communication scheme different from the first communication scheme, a signal relating to the first communication scheme being communicated between the adapter device and the source device, wherein
the sink device comprises:
a state register configured to store data; and
a first transceiver configured to transmit a state read request to the adapter device by driving a serial data line connected between the adapter device and the sink device to a low level when a serial clock line connected between the adapter device and the sink device is at a high level, if the data in the state register is updated,
the adapter device comprises:
a second transceiver configured to receive the state read request, and, in response to reception of the state read request, drive the serial data line to a low level and drive the serial clock line to a low level;
a transmitter configured to transmit the state read request to the source device after the serial clock line is driven to the low level; and
a receiver configured to receive a state read signal to read data of the state register from the source device,
the second transceiver transmits the state read signal to the sink device via the serial data line,
when the first transceiver of the sink device detects that the serial clock line is driven to the low level, the first transceiver stops operation of driving the serial data line to a low level, and
the second transceiver of the adapter device is configured to keep driving the serial clock line to the low level and driving the serial data line to the low level to transmit the state read request to the source device, until receiving the state read signal from the source device.

10. The communication system according to claim 9, wherein
upon receiving the state read signal, the first transceiver of the sink device transmits data in the state register to the adapter device via the serial data line, and
the second transceiver of the adapter device transmits the data received from the sink device to the source device.

* * * * *